United States Patent
Lee et al.

(10) Patent No.: US 8,589,987 B1
(45) Date of Patent: *Nov. 19, 2013

(54) CONSERVING BANDWIDTH BY RESTRICTING VIDEOS COMMUNICATED IN A WIRELESS TELECOMMUNICATIONS NETWORK

(75) Inventors: Woojae Lee, Manhattan, KS (US); Lyle T. Bertz, Lee's Summit, MO (US); Cesar Perez, Olathe, KS (US); Ryan Patrick Dreiling, Overland Park, KS (US); Jason D. Cole, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/471,709

(22) Filed: May 15, 2012

Related U.S. Application Data

(63) Continuation of application No. 12/501,794, filed on Jul. 13, 2009, now Pat. No. 8,214,862.

(51) Int. Cl.
| | |
|---|---|
| H04N 7/16 | (2011.01) |
| H04N 7/173 | (2011.01) |
| H04W 4/00 | (2009.01) |
| H04B 1/66 | (2006.01) |
| H04B 7/00 | (2006.01) |

(52) U.S. Cl.
USPC ............ 725/62; 725/95; 725/116; 370/332; 375/240; 455/513

(58) Field of Classification Search
None
See application file for complete search history.

(56) References Cited

U.S. PATENT DOCUMENTS

| | | | |
|---|---|---|---|
| 6,622,019 B1 * | 9/2003 | Shalem et al. | 455/445 |
| 7,689,717 B1 * | 3/2010 | Munshi et al. | 709/246 |
| 7,797,447 B1 * | 9/2010 | Schilit et al. | 709/245 |
| 7,882,442 B2 * | 2/2011 | Lawther et al. | 715/748 |
| 2004/0077345 A1 * | 4/2004 | Turner et al. | 455/423 |
| 2007/0107034 A1 * | 5/2007 | Gotwals | 725/129 |
| 2009/0060321 A1 * | 3/2009 | Gillard et al. | 382/154 |
| 2009/0288140 A1 * | 11/2009 | Huber et al. | 726/2 |
| 2009/0289788 A1 * | 11/2009 | Leblond | 340/540 |
| 2010/0103173 A1 * | 4/2010 | Lee et al. | 345/427 |
| 2010/0260122 A1 * | 10/2010 | Fisher | 370/329 |
| 2010/0296571 A1 * | 11/2010 | El-Saban et al. | 375/240.01 |
| 2011/0003554 A1 * | 1/2011 | Sekiya | 455/67.11 |
| 2011/0106736 A1 * | 5/2011 | Aharonson et al. | 706/12 |
| 2011/0110646 A1 * | 5/2011 | Smith et al. | 386/241 |

* cited by examiner

*Primary Examiner* — Brian Pendleton
*Assistant Examiner* — Ryan Stronczer

(57) ABSTRACT

A system and method for managing bandwidth used by videos in a wireless telecommunications network is provided. In one embodiment, the videos originate at mobile devices generating videos of a single event such as a concert, sporting event, graduation, or other event attended by multiple users. The mobile devices may communicate the videos to social networking websites where the videos may be viewed by multiple users. Embodiments of the present invention conserve bandwidth by selecting one or more of the videos of the single event to send to each of the destinations specified by all of the videos capturing the event. An instruction is then sent to each of the mobile devices generating nonselected video streams to discontinue transmission of the video streams.

14 Claims, 5 Drawing Sheets

CONSERVING BANDWIDTH BY RESTRICTING VIDEOS COMMUNICATED IN A WIRELESS TELECOMMUNICATIONS NETWORK

CROSS-REFERENCE TO RELATED APPLICATIONS

This application is a continuation of U.S. patent application Ser. No. 12/501,794, filed Jul. 13, 2009, the entirety of which is incorporated by reference herein.

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a method for conserving bandwidth in a radio access network is provided. The method includes receiving multiple video streams from a plurality of mobile devices located within a single geographic area. The method further includes determining that the multiple video streams are depicting a single event. The method includes selecting a single video stream from the multiple video streams for transmission to each destination address associated with the multiple video streams. The method further includes communicating the single video stream to each destination address associated with the multiple video streams. The method also includes communicating a first instruction to each mobile device generating a nonselected video stream to stop transmission of the nonselected video stream.

In another illustrative embodiment, one or more computer-readable media having computer-executable instructions embodiment thereon that when executed by a computing device perform a method of conserving bandwidth by responding to video transmission instructions received from a network component is provided. The method includes receiving, at the mobile device, a first instruction to start communicating a video stream to a video-sharing server. The video-sharing server receives video streams and communicates submitted video streams to one or more computing devices that request the submitted video streams. The method further includes receiving, at the mobile device, an event description describing an event depicted by the video stream. The method further includes communicating, over an air interface, the video stream and the event description. The method further includes receiving, at the mobile device, a second instruction to pause the video stream. The second instruction is received from a gateway that determined the video stream is less desirable than other video streams associated with the event description. The method also includes, in response to the second instruction, stopping said communicating of the video stream.

In a third illustrative embodiment, One or more computer-readable media having computer-executable instructions embodied thereon that when executed by a computing device perform a method of reducing bandwidth usage by mobile devices sending video streams over an air interface is provided. The method includes receiving multiple video streams from a plurality of mobile devices located within a single geographic area. The method includes determining that the multiple video streams are depicting a single event. The method further includes selecting one or more video streams from the multiple video streams. The method also includes communicating the one or more video streams to at least one destination address associated with the multiple video streams. The method also includes communicating a first instruction to each mobile device generating a nonselected video stream to stop transmission of the nonselected video stream.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
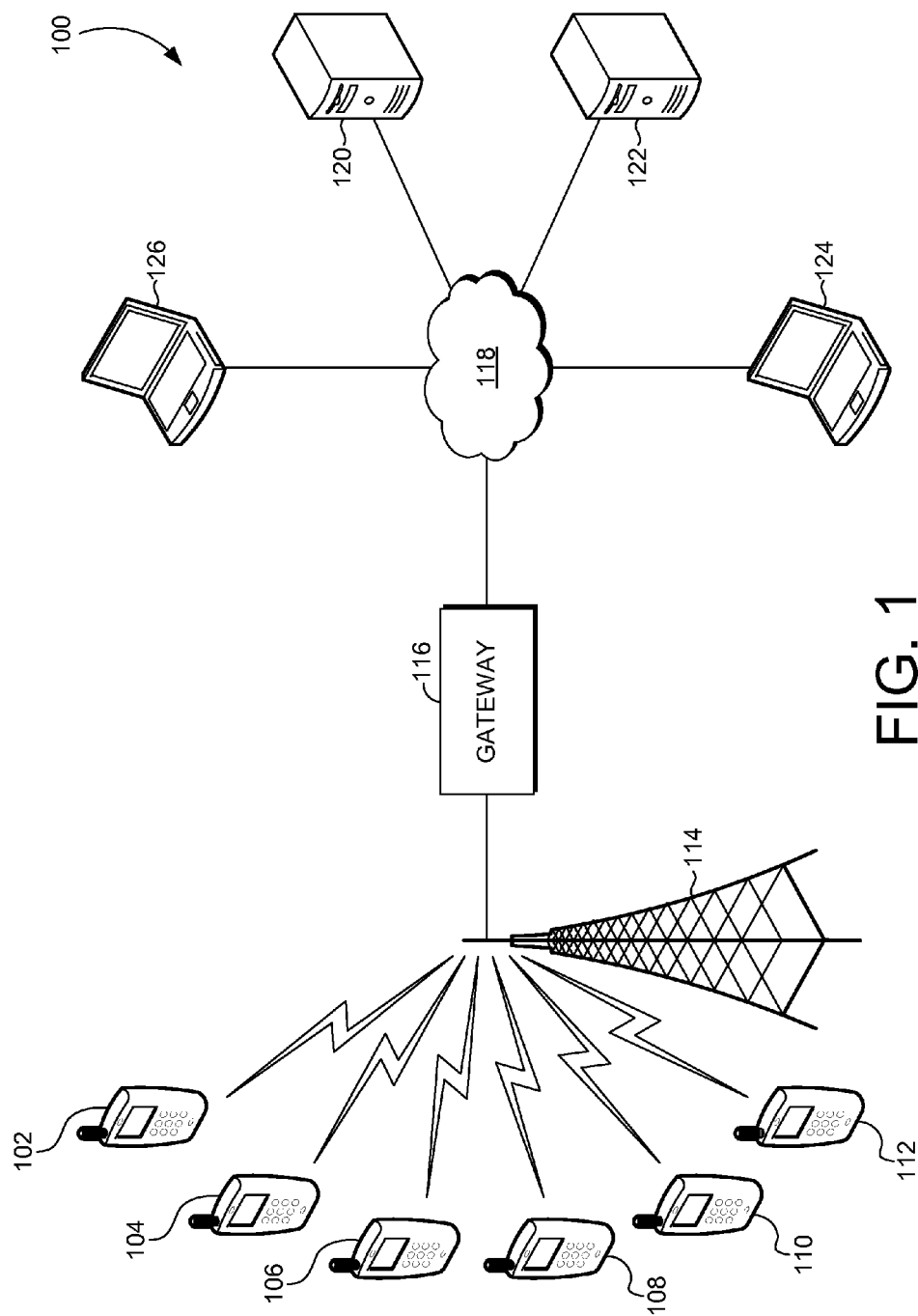
FIG. 1 is a diagram showing an illustrative operating environment suitable for practicing embodiments of the present invention.

Embodiments of the present invention provide a system and method for managing bandwidth used by videos. In one embodiment, the videos originate at mobile devices generating videos of a single event such as a concert, sporting event, graduation, or other event attended by multiple users. The mobile devices may communicate the videos to social networking websites where the videos may be viewed by multiple users. Embodiments of the present invention conserve bandwidth by selecting one or more of the videos of the single event to send to each of the destinations specified by all of the videos capturing the event. An instruction is then sent to each of the mobile devices generating nonselected video streams to discontinue transmission of the video streams. As explained in more detail subsequently, the selection of videos may be based on quality, location of the mobile device generating the video, feedback provided by a user of the mobile device, and other criteria. In general, the goal of the selection process is to choose the highest quality videos for transmission to the destination addresses.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobiles |
| LAN | Local Access Network |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, mobile device 104, mobile device 106, mobile device 108, mobile device 110, mobile device 112, a base station 114, a gateway 116, a network 118, a video-sharing server 120, a video-sharing server 122, a computing device 124, and the computing device 126. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 114. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobiles ("GSM"), or time division multiple access ("TDMA"), as well as others, to communicate with base station 114.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of accessing content over the Internet. Examples of content that may be received include text messages, multimedia messages, emails, calendar updates, web pages, videos, pictures, and task reminders. Further, mobile device 102 includes a camera that is capable of capturing video. The mobile device 102 may stream the video to a video-sharing server that hosts a website through which the videos may be viewed by others through devices that communicate with the video-sharing server 122. The mobile device 102 may be associated with a user. The user is the person submitting instructions and interacting with the mobile device 102. Each of mobile device 104, mobile device 106, mobile device 108, mobile device 110, and mobile device 112 may be substantially similar to mobile device 102. The illustrative operating environment 100 may have any number of mobile devices. Six mobile devices are shown for the sake of simplicity.

Base station 114 is a fixed station used for communicating with mobile device 102, mobile device 104, mobile device 106, mobile device 108, mobile device 110, and mobile device 112. Standard air interface protocols, such as code division multiple access ("CDMA"), global system for mobiles ("GSM"), or time division multiple access ("TDMA"), as well as others, may be used by base station 114 to communicate with mobile devices. Other network communications interface arrangements are also possible. A base station controller (not shown) is responsible for handling traffic and signaling with mobile device 102, mobile device 104, mobile device 106, mobile device 108, mobile device 110, and mobile device 112. Only one base station 114 is shown, and without its many components, for the sake of clarity. Mobile device 102, mobile device 104, mobile device 106, mobile device 108, mobile device 110, and mobile device 112 could be in simultaneous communication with multiple base stations. The base station 114 and related components may be described as a radio-access network. A radio-access network may be one part of a larger wireless telecommunications network.

Gateway 116 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 118) of illustrative operating environment 100. Access gateway 116 might be, for example, an ASN-GW, a PDSN, an SGSN/GGSN, and the like. The gateway 116 includes a computing device that may include a CPU, short-term memory, long-term memory, and one or more network interfaces. The network interfaces are used to communicate data between the network 118 and devices, such as mobile device 102, connected to the access-facing portion of illustrative operating environment 100. A network interface to the WAN or LAN could be wired, wireless, or both.

Network 118 may include one or more mobile networks, one or more packet-based networks, including the Internet, and the public-switched telephone network ("PSTN"). The various components within network 118 may be owned and/or operated by multiple entities, commercial or otherwise. Network 118 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The video-sharing server 120 receives videos from mobile-devices and other computing devices and communicates the video to other devices upon receiving a request for the video. The video-sharing server 120 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the video-sharing server 120 facilitates transmission of media content (e.g., movies, web pages, videos, MP3s, etc.) to computing devices 124 and 126. The video-sharing server 120 transmits the media over the network 118. In addition to receiving and sharing videos, the video-sharing server 120 may also host web pages that are transmitted to a requesting device. The web pages may serve as an interface for users to request certain videos. Other actions associated with web servers may also be performed by the video-sharing server 120. The video-sharing server 120 may facilitate a social networking site where a user uploads a video that may be accessed by a designated group of users. Many users may upload videos of what they are doing or seeing at the present time to share with their friends. For example, multiple users at a sporting event may send videos of the sporting event to their friends. A particular video-sharing server 120 may receive many similar videos depicting the same event. In addition, a single user may address a single video to multiple video-sharing servers. The video-sharing server 122 may be similar to video-sharing server 120.

The computing device 124 allows a user to access content on other computing devices over network 118. The computing device 124 may include a bus that directly or indirectly couples the following devices: memory; one or more processors; one or more presentation components such as a display or speaker; input/output (I/O) ports; I/O components; and a power supply such as a battery. The computing device 124 includes a network interface that allows the computing device 124 to receive and send communications over network 118. The computing device 124 includes, or is coupled to, a display device capable of displaying video to a user. The computing device 124 may take the form of a desktop computer, laptop computer, PDA, smart phone, and/or other similar device. The computing device 124 may request video from the video-sharing server 120 that has been uploaded to the video-sharing server 120 from the mobile device 102. Computing device 126 may be similar to computing device 124.

Figure 2:
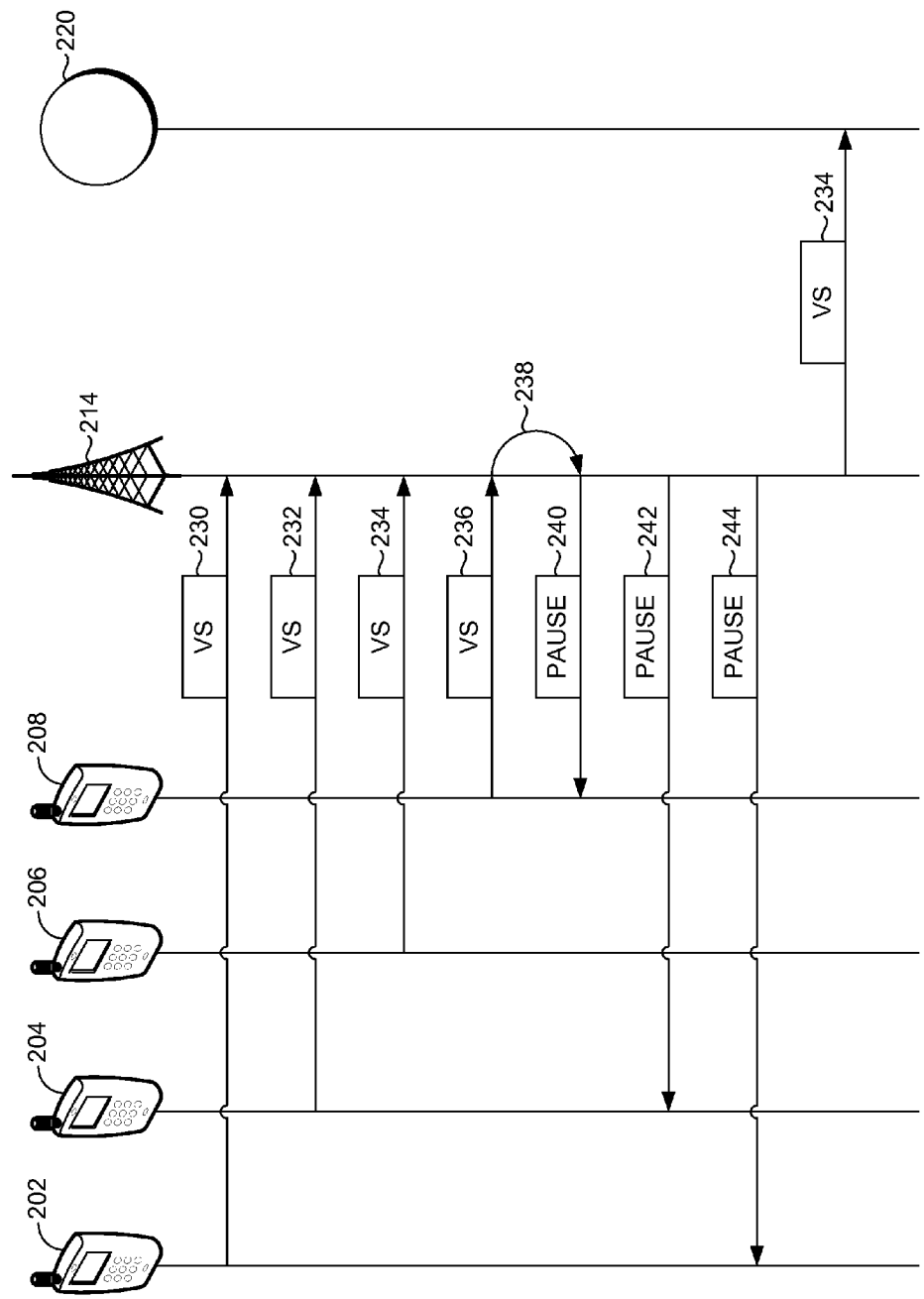
FIG. 2 is a diagram showing communications occurring between mobile devices, a base station, and a video-sharing server while conserving bandwidth over the air interface connecting the mobile devices to the base station, in accordance with an embodiment of the present invention.

FIG. 2 shows communications occurring between mobile devices, a base station, and a video-sharing server while conserving bandwidth over the air interface connecting the mobile devices to the base station, in accordance with an embodiment of the present invention. The mobile device 202, the mobile device 204, the mobile device 208, and the mobile device 206 may be similar to the mobile device 102 described previously with reference to FIG. 1. Similarly, the base station 214 may be similar to the base station 114 described previously with reference to FIG. 1. The video-sharing server 220 may be similar to the video-sharing server 120 described previously with reference to FIG. 1.

The mobile devices 202, 204, 206, and 208 are each located within the same geographic area. The geographic location of an individual mobile device may be determined based on global positioning applications on the mobile devices. The mobile devices 202, 204, 206, and 208, may transmit their location to the base station 214. In one embodiment, the area is defined by a known event. For example, the mobile devices 202, 204, 206, and 208 may be determined to be within a geographic area known to be an event venue.

Initially, each mobile device sends a video stream to the base station 214. The mobile device 202 sends a video stream 230 to the base station 214. The mobile device 204 sends a video stream 232 to the base station 214. The mobile device 206 sends a video stream 234 to the base station 214. Similarly, the mobile device 208 sends a video stream 236 to the base station 214. Each of these video streams may be addressed to one or more different destinations. For example, video stream 230 may be addressed to destinations X and Y. Video stream 232 may be addressed to destination A. Video stream 234 may be addressed to destinations B, C, and D, and video stream 236 may be addressed to destination A. Thus, the video streams may have the same address, multiple addresses, or different addresses. Initially, the base station 214 (or a component affiliated with the base station 214) determines that the video stream 230, 232, 234, and 236 are depicting the same event. In one embodiment, this determination is made by evaluating the description sent with the video streams. A user may assign a description to a video stream that is sent to a social networking site to act as a label for the video feed. Thus, video streams 230, 232, 234, and 236 may include a description that has the same keywords, such as a team name, stadium name, facility name, event name, performer name, or other keyword associated with an event. Thus, based on the descriptions attached to the video streams 230, 232, 234, and 236, components associated with the base station 214 may determine that each of the video streams is depicting the same event. In another embodiment, the geographic location of the mobile device sending the video stream is used to determine that the video streams are depicting the same event. For example, all video streams originating from mobile devices within a known event venue may be determined to be depicting the same event. For the sake of illustration, the video streams shown in FIG. 2 are assumed to be depicting the same event.

Upon determining multiple video streams are depicting the same event, the base station 214 and associated components select 238, one of the videos for transmission to each of the destination addresses associated with the video streams 230, 232, 234, and 236. The goal of the selection is to determine the video with the best quality to transmit to each of the destinations. Embodiments of the present invention are not limited to selecting a single video for retransmission to each of the destinations. In some instances, it may be desirable to select multiple videos to be sent to each of the intended destinations. For the sake of simplicity, a single video is selected in FIG. 2.

A number of different factors may be considered when determining the video stream with the highest quality. For example, the signal strength of the video stream, the packet loss of the video stream, and the characteristics of the mobile device generating the video stream may be considered. The characteristics of the mobile device generated in a particular video stream may be determined from the mobile device's profile information. In another embodiment, users of the respective mobile devices 202, 204, 206, and 208, provide subjective feedback rating the quality of their video stream. For example, a user in the nosebleed seats at an event may give their video stream a lower rating than a user of a mobile device sitting in the front row. Similarly, a user with a partially obstructed view may give their video stream a subjectively lower rating. In another embodiment, the geographic location of the mobile device generating the stream is considered when ascertaining the presumptive quality of the video. For example, the components associated with the base station 214 may be programmed to recognize when certain events are ongoing. Various locations within the event's venue may be assigned ratings that are used to determine the presumptive quality of the video. For example, mobile devices determined to be closer to a field or stage may be given a higher-quality rating. In addition, a computerized analysis of the video may be performed to determine the quality of the video. In one embodiment, extremely light or extremely dark videos are given a lower-quantitative score. Other criteria such as the stability of the picture may be considered. One or more of these factors may be used in combination to rate the overall quality of the video. When used in combination, different weighting may be given to different factors.

Upon selecting 238 a video for transmission, an instruction is sent to the mobile device's generating video streams that were not selected. Thus, in this embodiment, the video stream 234 generated by the mobile device 206 is selected 238 for transmission to the destination addresses. Accordingly, a pause instruction 240 is sent to the mobile device 208. A pause instruction 242 is sent to the mobile device 204 and a pause instruction 244 is sent to the mobile device 202. Upon receiving the pause instructions 240, 242, and 244, the mobile devices 202, 204, and 208 cease transmission of the video streams to the base station 214. This conserves bandwidth on the air interface between the mobile devices and the base station 214. The video stream 234 is then communicated to the video-sharing server 220, which is at least one of the destination addresses specified in video streams 230, 232, 234, or 236. For the sake of simplicity, only a single destination is shown in FIG. 2, but in embodiments of the present invention the video stream 234 would be sent to each of the destination addresses specified in the video streams received by the base station that are determined to be depicting the same event. Embodiments of the present invention are not limited to performing the selection process on videos received at a single base station 214. In some instances, mobile devices at a single event may be able to connect to multiple base stations, including temporary device base stations set up to provide supplemental coverage during a particular event. In such cases, the selection process may be run by a component having a view of all the videos being received by base stations within the vicinity of the event.

Though not shown in FIG. 2, upon satisfaction of one or more criteria, the base station 214 may send a second instruction to the mobile devices 202, 204, and 208 to which a pause instruction was previously sent. The second instruction asks the mobile device to begin transmitting a video stream to the base station. The base station 214 may then reevaluate the new videos to determine if the best available video has changed. Upon making this determination, the process is repeated with pause instructions being sent to mobile devices generating nonselected videos and with the best video being transmitted to the destinations. The one or more criteria used to determine that a second instruction should be sent include the passing of a threshold amount of time, a detected change in the signal strength or packet loss between a particular mobile device and a base station 214, and receiving human input from the user of a mobile device indicating the subjective quality of their mobile device's video stream has increased. The human input may be transmitted to the base station through an SMS message or other type of message. In addition, a change in the mobile device's location to a preferred location may satisfy the criteria and cause the base station 214 to send the second instruction.

Figure 3:
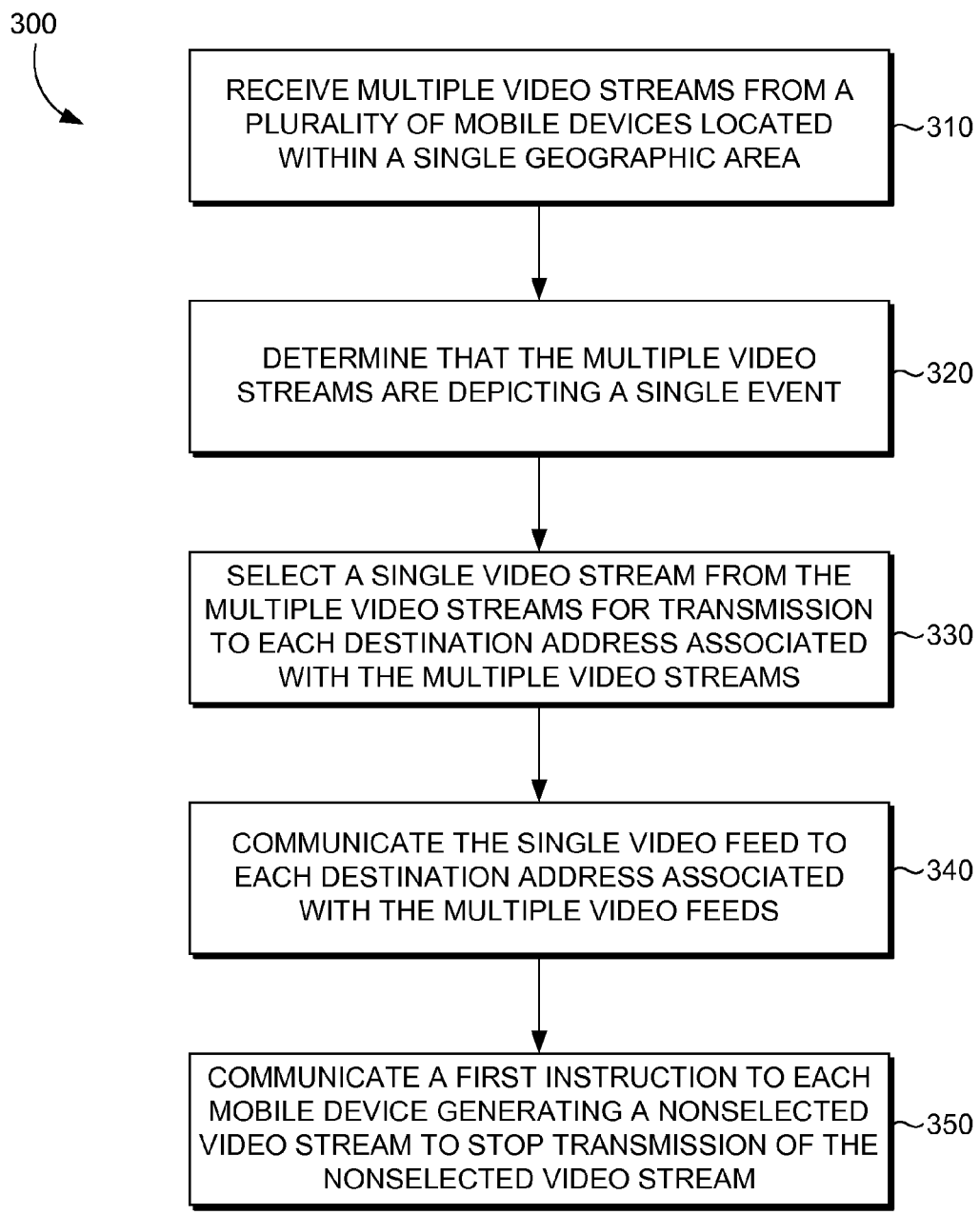
FIG. 3 is a flow chart showing a method for conserving bandwidth in a radio access network, in accordance with an embodiment of the present invention.

Turning now to FIG. 3, a method 300 for conserving bandwidth in a radio access network is shown, in accordance with an embodiment of the present invention. The radio access network may be similar to the operating environment described with reference to FIG. 1. In general, the radio access network may include one or more base stations capable of receiving radio signals from mobile devices, such as smart phones, PDA's, cell phones, pagers, and other devices. In embodiments of the present invention, the mobile devices include cameras capable of generating video. The bandwidth conserved may be the radio bandwidth available between the mobile devices and one or more base stations. In another embodiment, the bandwidth conserved is between the base station and other components of a wireless telecommunications network of which the radio access network is a part.

At step 310, multiple video streams are received from a plurality of mobile devices located within a single geographic area. As described previously, a geographic area may be defined as the venue hosting an event. The location of the mobile devices may be determined based on location data provided by a GPS application on the mobile devices. In one embodiment, the multiple video streams are received at a gateway associated with one or more base stations.

At step 320, the multiple video streams are determined to depict a single event. As described previously, this determination may be made based on a description of the video stream provided by users of the mobile devices generating the video streams. In another embodiment, the location of the mobile devices may be used to determine that a single event is being depicted. For example, all video streams generated by mobile devices known to be located within a venue hosting an event, may be determined to be depicting the single event. In another embodiment, coordination may occur with a video-sharing site designed to depict and allow access to videos of a certain event. So, all videos generated and addressed to such a video-sharing server may be determined to be depicting a single event based on input from the video-sharing server.

At step 330, a single video stream from the multiple video streams is selected for transmission to each destination address associated with the multiple video streams. As described previously, an individual video stream may be addressed to one or more destination addresses. In one embodiment, only video streams designated for public consumption are selected. Video streams designated as private may be disregarded in an embodiment of the present invention. In one embodiment, private videos are not selected for transmission to multiple destinations but may nevertheless be paused or terminated. A video designated as public may be transmitted in place of the private video to the intended destination.

At step 340, the previously selected video feed is communicated to each destination address associated with the multiple video feeds. As described previously, each of the videos received in the multiple video streams may be addressed to one or more destinations. The single video may be sent to each of these destinations. Thus, each intended destination receives a video depicting the event.

At step 350, a first instruction is communicated to each mobile device generating a nonselected video stream to stop transmission of the nonselected video stream. In one embodiment, the first instruction is sent multiple video streams only when the multiple video streams are determined to utilize above a threshold amount of bandwidth. In another embodiment, above a threshold number of videos must be detected prior to sending the first instruction to the mobile devices generating the nonselected video streams.

Figure 4:
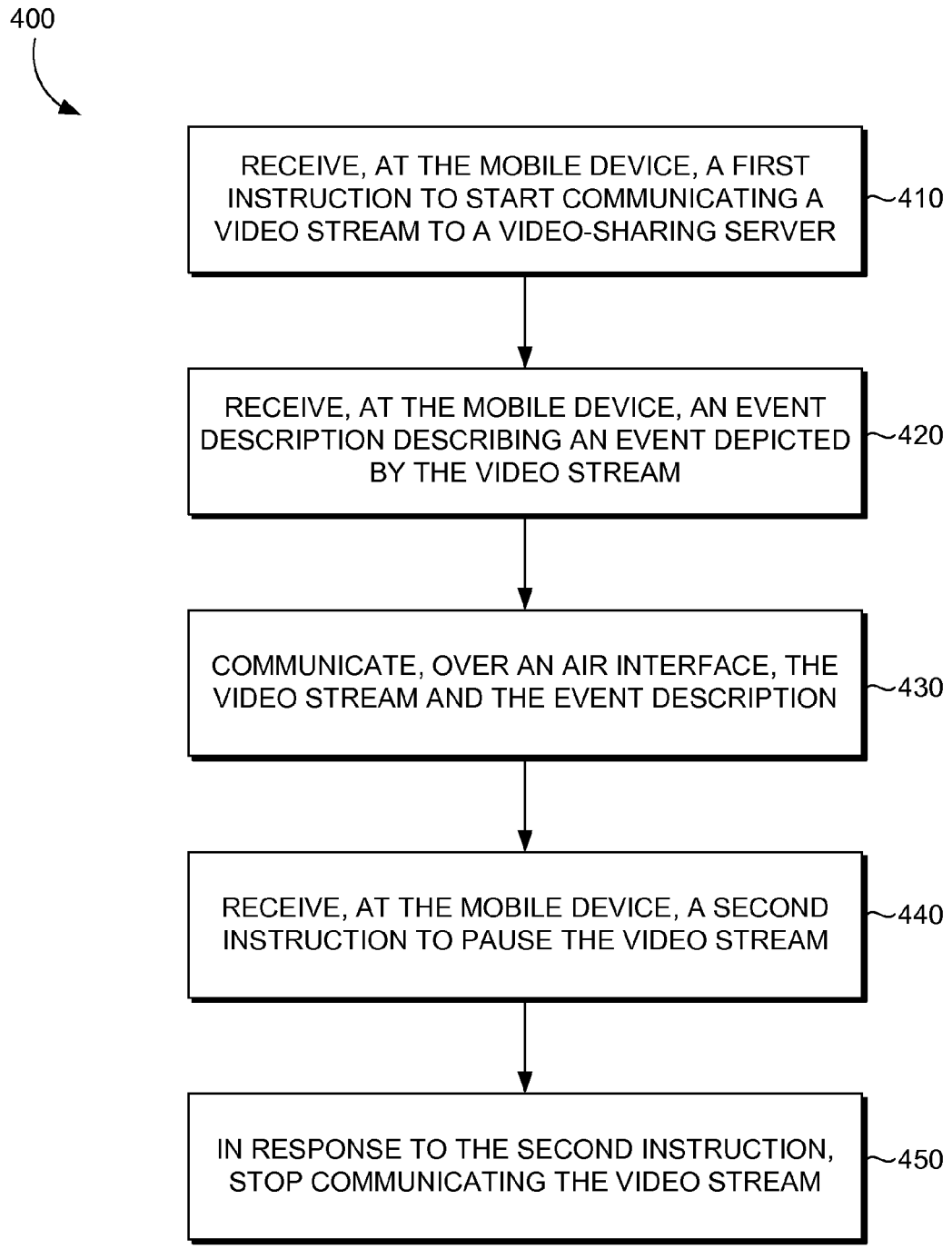
FIG. 4 is a flow chart showing a method of conserving bandwidth by responding to video transmission instructions received from a network component, in accordance with an embodiment of the present invention.

Turning now to FIG. 4, a method 400 of conserving bandwidth by responding to video transmission instructions received from a network component is provided, according to an embodiment of the present invention. The method described in FIG. 4 may be performed on a mobile device that is sending video over an air interface to a radio-access network. As described previously, a network component such as a gateway or portion of a base station may send instructions to a mobile device in an effort to reduce video traffic over the air interface.

At step 410, the mobile device receives a first instruction to start communicating a video stream to a video-sharing server. The mobile device receives this first instruction from a user of the mobile device. The instruction may be entered through an interface such as a keyboard on the mobile device. In one embodiment, the mobile device has a touch screen interface to receive the first instruction. The instruction may designate a video-sharing server by the destination address associated with the video-sharing server. In another embodiment, the first instruction is input into an interface that as part of an application running on the mobile device that is affiliated with the video-sharing server. The affiliated application may have addressing and other permissions preprogrammed and the application may automatically send video upon receiving the instruction from the user. As described previously, a video-sharing server receives video streams from one or more mobile devices and communicates the submitted video streams to one or more computing devices that request the submitted video streams. A mobile device could be one example of a computing device. For example, a mobile device could submit the video, and a second mobile device could retrieve the video. Laptops, desktops, and other components with network connectivity are additional examples of computing devices that may request the submitted video streams.

At step 420, the mobile device receives an event description describing an event depicted by the video stream. The event description may be typed in by a user and associated with the video. In another embodiment, the user selects from one or more events presented by the mobile device. The one or more events may be presented based on the geographic location of the mobile device. An application on the mobile device may interface with a video-sharing server or other component that tracks events that users may wish to record. The one or more presented events may be events known to occurring on the date the video was generated near the location of the mobile device.

At step 430, the video stream and the event description is communicated over an air interface to a base station. At step 440, subsequent to said communicating, the mobile device receives a second instruction to pause the video stream. The second instruction may be received from a gateway associated with the network to which the video is sent. In the alternative, other components associated with the base station may generate the second instruction. The second instruction is sent upon determining the video stream sent by the mobile device is less desirable than other video streams associated with the event description. As described previously, the gateway may be receiving multiple video streams depicting the single event from multiple mobile devices. Methods of evaluating the comparative desirability of multiple video streams have been described previously. At step 450, in response to the second instruction, the mobile device stops communicating the video stream to the network. In one embodiment, the fact that the video stream is no longer being sent to the network is conveyed to the user of the mobile device through an indication on the mobile device's display.

The method may further include determining a condition for restarting communication of the video stream has been satisfied. Upon determining the condition has been satisfied, the mobile device may resume communication of the video over the air interface. The conditions include determining that the signal strength between the mobile device and the radio-access network has improved since the mobile device initially sent the video to the radio-access network. In addition, the mobile device may determine that the amount of packet loss between the mobile device and the radio-access network has decreased since the mobile device initially sent the video to the network. In addition, the condition could be satisfied when either the signal strength increases above a threshold signal strength or the packet loss decreases below a threshold packet loss. In a further embodiment, the condition is satisfied when the user of the mobile device provides input indicating an improved vantage point on the event has been achieved. In another embodiment, the condition is satisfied after an elapse of a threshold period of time. For example, a mobile device could initiate retransmission of video every four minutes. The network would then reevaluate the video stream based upon the other video streams being received and either use the new video stream or send an additional instruction to discontinue transmission of the video stream. The indication presented to the user may be updated depending on whether the video stream is currently being used or is nonselected. This indication may motivate the user to try to improve the quality of the video they are sending to the network.

Figure 5:
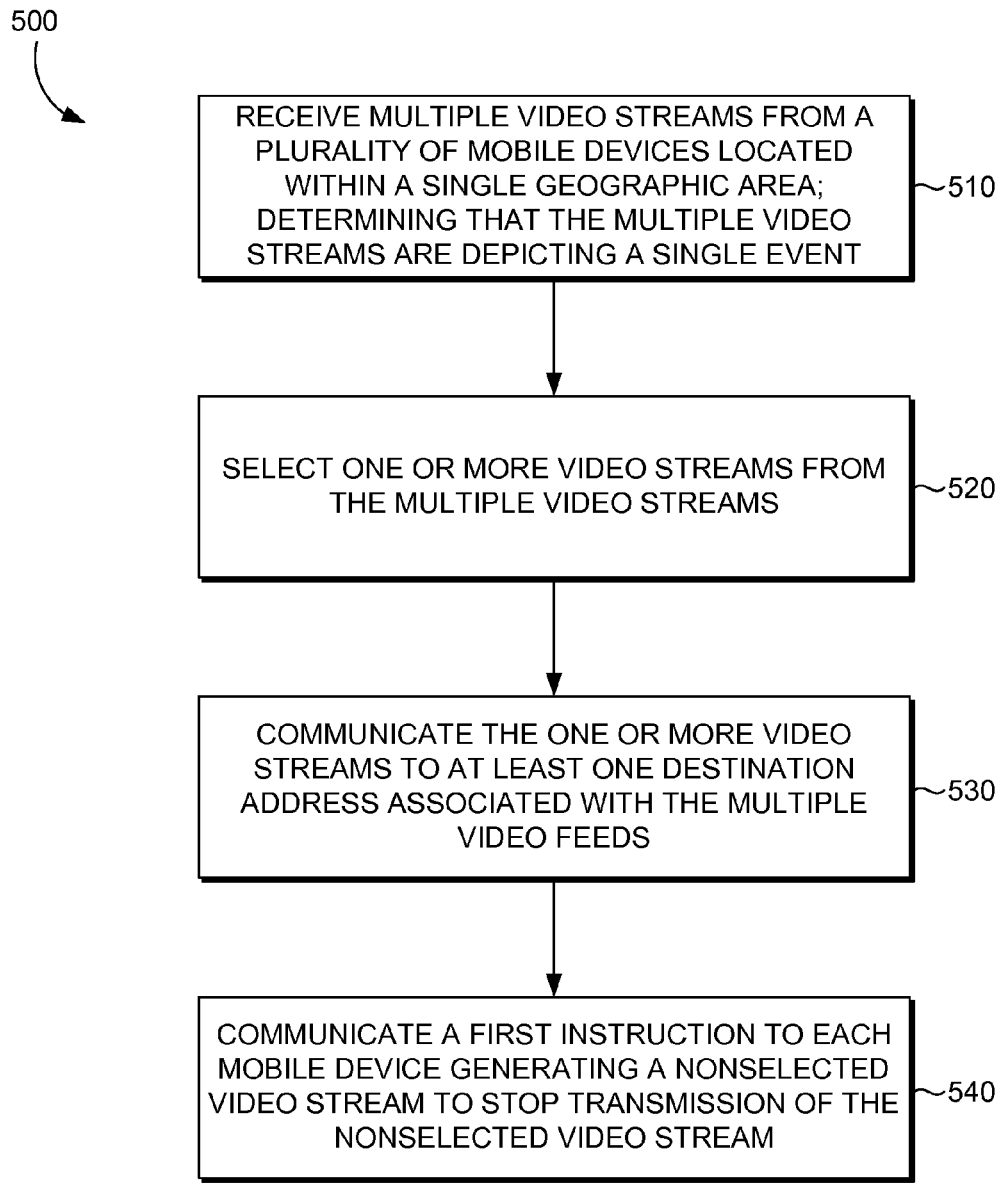
FIG. 5 is a flow chart showing a method of reducing bandwidth usage by mobile devices sending video streams over an air interface, in accordance with an embodiment of the present invention.

Turning now to FIG. 5, a method 500 of reducing bandwidth usage by mobile devices sending video streams over an air interface is provided, in accordance with an embodiment of the present invention. At step 510, multiple video streams are received from a plurality of mobile devices located within a single geographic area. The multiple video streams are determined to be depicting a single event. Methods of determining whether a single event is being depicted have been described previously. At step 520 one or more video streams are selected from the multiple video streams. Methods of selecting the one or more video streams have been described previously. In general, the highest-quality or most desirable video streams may be selected. When multiple video streams are selected, the method may intentionally choose different vantage points for transmission to the one or more destinations. For example, a vantage point near a concert stage, in the upper deck of the concert venue, and a view from one other vantage point may all be selected. The best video streams being received from these general areas may be transmitted to the various destination addresses.

At step 530, the one or more video streams are communicated to at least one destination address associated with the multiple video streams. In one embodiment, the one or more video streams are transmitted or communicated to each destination address associated with each of the videos. In another embodiment, only a single video is selected for transmission. In some cases, whether one or more videos are selected for transmission may depend on the destination address. For example, a video-sharing server set up to display multiple videos of a single event may receive multiple videos. On the other hand, a destination that appears to be set up to receive only a single video may be sent only a single video. At step 540, a first instruction is communicated to each mobile device generating a nonselected video stream to stop transmission of the nonselected video stream. Stopping the transmission of nonselected video streams conserves bandwidth over the air interface. The component performing method 500 may periodically send an instruction to the one or more mobile devices generating a nonselected video stream to ask them to retransmit a new video stream. The new video streams may then be reevaluated to ensure that the best video streams available are being selected for retransmission to the destination addresses.

Various privacy safeguards may be incorporated into method 500 and other embodiments described previously. For example, a user may be able to designate a video stream as private. Video streams designated as private may be disregarded during this method. In other words, video streams designated as private will not be selected for use or evaluated to be sent to multiple destinations. Similarly, a video designated as private may just be sent to the destination address rather than being substituted with a different, higher quality video. In one embodiment, the private video may be replaced with a non-private video. In one embodiment, a user designates the privacy status or changes the status of a particular video through the interface on the mobile device.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for conserving bandwidth in a radio access network, the method comprising:
   receiving multiple video streams from a plurality of mobile devices located within a single geographic area;
   determining that the multiple video streams are depicting a single event; selecting a single video stream from the multiple video streams for transmission to each destination address associated with the multiple video streams;
   communicating the single video stream to said each destination address associated with the multiple video streams; and
   communicating a first instruction to each mobile device generating a nonselected video stream to stop transmission of the nonselected video stream; and
   communicating a second instruction to a single mobile device that was previously generating a nonselected video stream to start transmitting a new video stream, upon detecting a condition for restarting communication of the video stream has been satisfied for the single mobile device.

2. The method of claim 1, wherein the method further comprises determining that the multiple video streams depict the single event because each of the multiple video streams includes a similar subject matter description.

3. The method of claim 1, wherein the method further comprises determining that the multiple video streams are using above a threshold amount of bandwidth that is a fixed percentage of available bandwidth capacity of one or more radio interfaces receiving the multiple video streams.

4. The method of claim 1, wherein said selecting the single video stream from the multiple video streams is based on video stream quality measured by one or more of an amount of packet loss for an individual video stream and a signal strength for the individual video stream.

5. The method of claim 4, wherein the second instruction is sent upon detecting an improved signal strength from the single mobile device.

6. The method of claim 1, wherein said selecting the single video stream from the multiple video streams is based on video stream quality measured by an automated quality analysis of an individual video stream.

7. The method of claim 1, wherein said selecting the single video stream from the multiple video streams is based on video stream quality measured by characteristics of a camera associated with a mobile device generating an individual video stream.

8. One or more non-transitory computer-readable media having computer-executable instructions embodiment thereon that when executed by a computing device perform a method of reducing bandwidth usage by mobile devices sending video streams over an air interface, the method comprising:
   receiving multiple video streams from a plurality of mobile devices located within a single geographic area;
   determining that the multiple video streams are depicting a single event;
   selecting a subset of video streams from the multiple video streams depicting the single event;
   communicating subset of video streams to at least one destination address associated with the multiple video streams;
   communicating a first instruction to each mobile device generating a nonselected video stream to stop transmission of the nonselected video stream;
   communicating a second instruction to a single mobile device that was previously generating a nonselected video stream to start transmitting a new video stream, upon detecting a condition for restarting communication of the video stream has been satisfied for the single mobile device.

9. The media of claim 8, wherein the method further includes determining that each of the multiple video streams is designated for public display.

10. The media of claim 8, wherein the method further comprises determining that the multiple video streams depict the single event because each of the multiple video streams includes a similar subject matter description.

11. The media of claim 8, wherein the method further includes:
   determining a geographic location of each of the plurality of mobile devices; and
   said selecting each stream of the selected subset of video streams based on the geographic location of a mobile device generating an individual video stream such that the selected subset of video streams include videos providing a variety of perspectives on the single event.

12. The media of claim 8, wherein the condition is an improved signal strength from the single mobile device.

13. The media of claim 8, wherein said selecting the subset of video streams from the multiple video streams is based on video quality measured by an automated quality analysis of individual video streams within the multiple video streams.

14. The media of claim 8, wherein said selecting the subset of video streams from the multiple video streams is based on quality ratings provided by users of mobile devices generating the one or more videos.

* * * * *